United States Patent
Negishi

(10) Patent No.: US 11,105,935 B2
(45) Date of Patent: Aug. 31, 2021

(54) IMAGE SENSOR AND IMAGE CAPTURING APPARATUS

(71) Applicant: CANON KABUSHIKI KAISHA, Tokyo (JP)

(72) Inventor: Norio Negishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 16/519,702

(22) Filed: Jul. 23, 2019

(65) Prior Publication Data

US 2020/0033482 A1 Jan. 30, 2020

(30) Foreign Application Priority Data

Jul. 25, 2018 (JP) .............................. JP2018-139621

(51) Int. Cl.

| | |
|---|---|
| *G01T 1/17* | (2006.01) |
| *G01T 1/29* | (2006.01) |
| *G01J 1/42* | (2006.01) |
| *G01J 1/18* | (2006.01) |
| *G01J 1/04* | (2006.01) |
| *G01T 1/24* | (2006.01) |
| *H04N 5/345* | (2011.01) |
| *G01J 1/44* | (2006.01) |

(52) U.S. Cl.
CPC ............... *G01T 1/17* (2013.01); *G01J 1/0492* (2013.01); *G01J 1/18* (2013.01); *G01J 1/4228* (2013.01); *G01T 1/247* (2013.01); *G01T 1/2928* (2013.01); *H04N 5/3456* (2013.01); *G01J 2001/442* (2013.01); *G01J 2001/4466* (2013.01)

(58) Field of Classification Search
CPC .......... G01J 1/0228; G01J 1/0492; G01J 1/18; G01J 1/4228; G01J 1/44; G01J 3/513; G01J 2001/442; G01J 2001/4466; G01T 1/17; G01T 1/247; G01T 1/2928; H04N 5/3456; H04N 5/37455
See application file for complete search history.

(56) References Cited

U.S. PATENT DOCUMENTS

| | | | |
|---|---|---|---|
| 2014/0334600 A1* | 11/2014 | Lee ........................ | A61B 6/482 378/62 |
| 2016/0370475 A1* | 12/2016 | Kawata ..................... | G01T 1/17 |
| 2017/0205284 A1* | 7/2017 | De Geronimo ........... | G01J 1/44 |
| 2018/0017685 A1* | 1/2018 | Cao .......................... | G01T 1/244 |
| 2018/0017687 A1* | 1/2018 | Cao ......................... | H01L 31/115 |
| 2018/0364373 A1* | 12/2018 | Hondongwa ............. | G01T 1/17 |
| 2019/0004191 A1* | 1/2019 | Cao .......................... | G01T 1/244 |

FOREIGN PATENT DOCUMENTS

JP 2014-081253 A 5/2014

* cited by examiner

*Primary Examiner* — Mark R Gaworecki
(74) *Attorney, Agent, or Firm* — Cowan, Liebowitz & Latman, P.C.

(57) ABSTRACT

An image sensor comprises a plurality of pixels, each pixel including: a light-receiving element that outputs an output voltage that varies in response to a photon entering; at least one comparator that compares the output voltage with a plurality of mutually-different threshold voltages and outputs a single signal each time the output voltage varies so as to exceed either of the threshold voltages; and at least one counter that counts a number of signals output by the comparator upon comparing the output voltage with the plurality of threshold voltages and outputs a count value, for each of the threshold voltages.

14 Claims, 8 Drawing Sheets

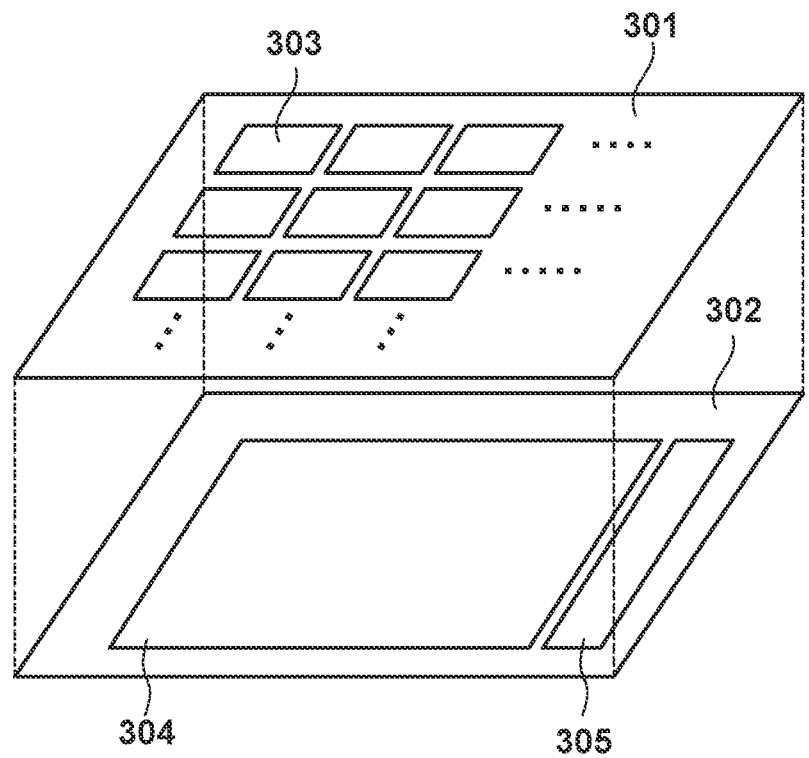

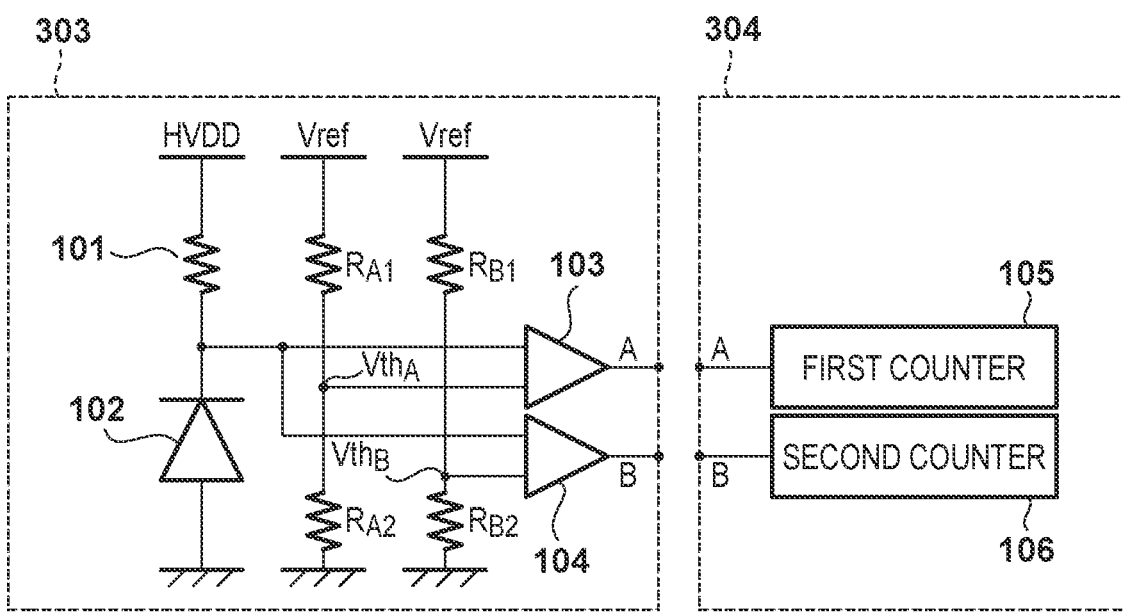

FIG. 6A

| R  | Gr | R  | Gr | R  | Gr |
|----|----|----|----|----|----|
| Gb | B  | Gb | B  | Gb | B  |
| R  | Gr | R  | Gr | R  | Gr |
| Gb | B  | Gb | B  | Gb | B  |
| R  | Gr | R  | Gr | R  | Gr |
| Gb | B  | Gb | B  | Gb | B  |

FIG. 6B

| R  | Gr | R  | Gr | R  | Gr |
|----|----|----|----|----|----|
| Gb | B  | Gb | B  | Gb | B  |
| R  | Gr | R  | Gr | R  | Gr |
| Gb | B  | Gb | B  | Gb | B  |
| R  | Gr | R  | Gr | R  | Gr |
| Gb | B  | Gb | B  | Gb | B  |

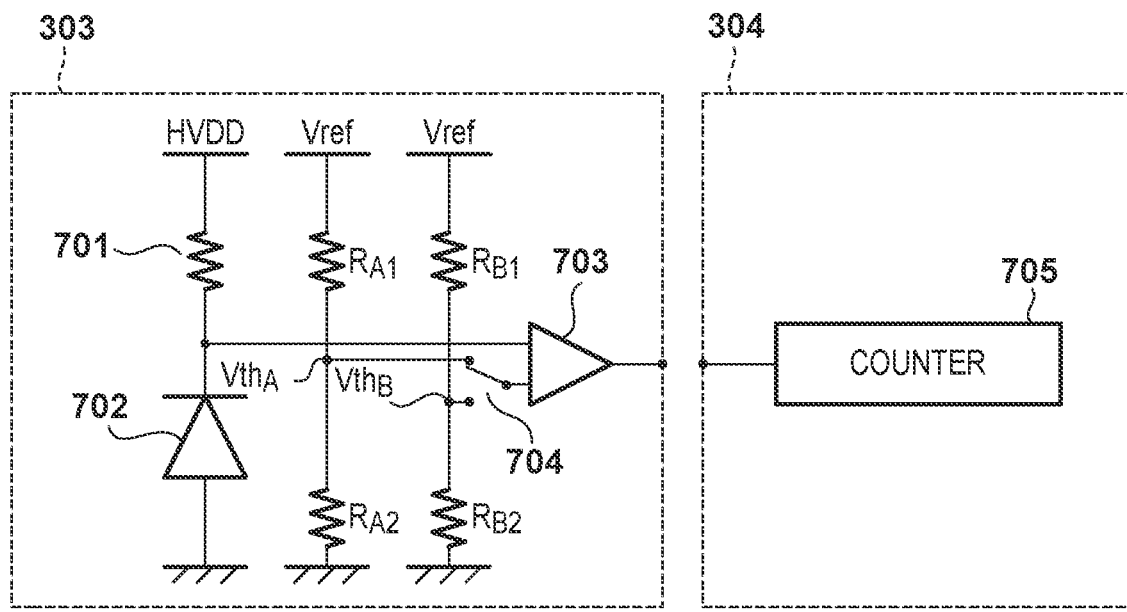

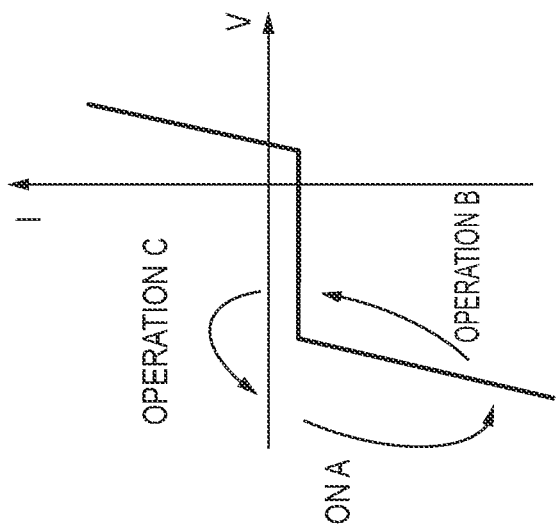
F I G. 9A
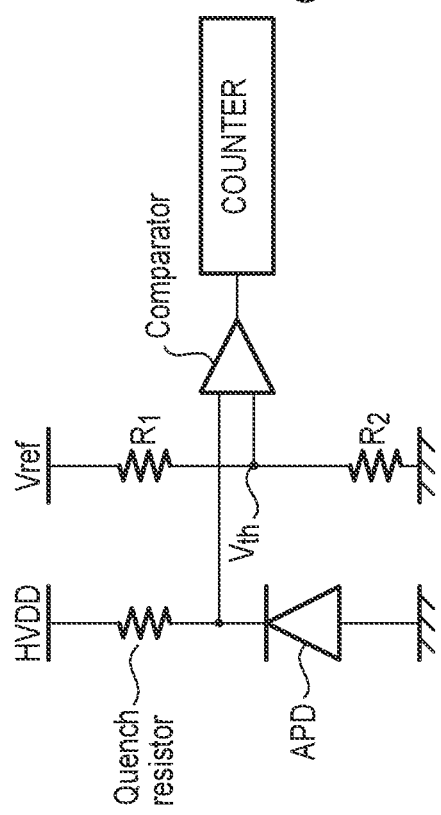
F I G. 9B
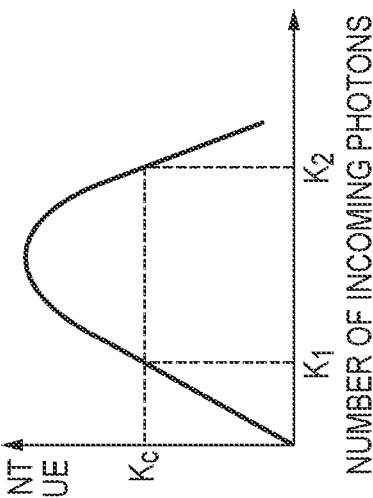
F I G. 9E
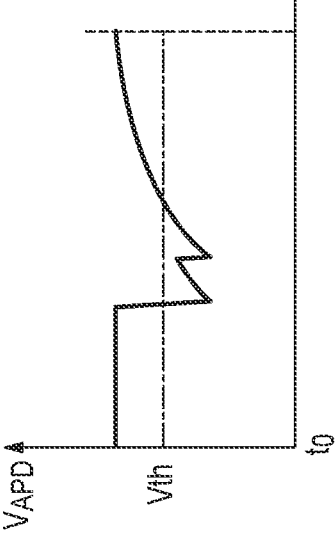
F I G. 9D
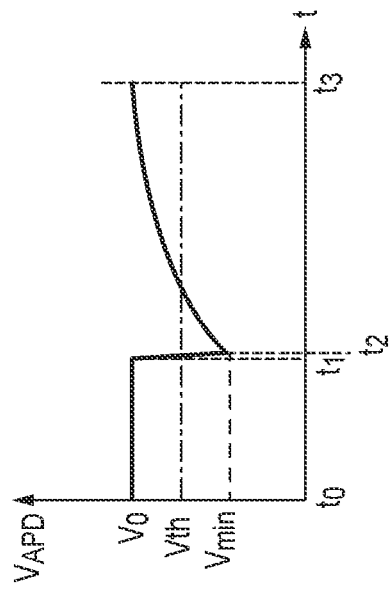
F I G. 9C

IMAGE SENSOR AND IMAGE CAPTURING APPARATUS

BACKGROUND OF THE INVENTION

Field of the Invention

The present invention relates to an image sensor and an image capturing apparatus, and particularly relates to a technique involving a photon counting type image sensor.

Description of the Related Art

Image sensors used in conventional digital cameras and the like typically employ photodiodes (PDs) using a charge accumulation method. The charge accumulation method is a method for photoelectrically converting the photons that have entered the PDs in a certain period and obtaining an analog amount called a voltage value. With the charge accumulation method, when photons enter a PD, the PD generates and accumulates a charge substantially linearly with respect to the number of photons entering the PD. The charge accumulated in the PD is transferred to a floating diffusion (FD) unit and converted into a voltage. The voltage converted by the FD is amplified by a source-follower (SF), converted into a digital signal by an AD converter, and output to the exterior.

With the charge accumulation method, it is known that when, for example, the voltage in the FD is amplified by the SF, the S/N ratio drops due to Random Telegraph Signal (RTS) noise produced at the boundary of the SF gate.

Meanwhile, recent years have seen investigations into photon counting type image sensor that use an avalanche phenomenon occurring when avalanche photodiodes (APDs) are operated in Geiger mode to measure the number of incoming photons themselves and output that number as a digital signal.

When an APD is operated in Geiger mode, an observable current is produced by the avalanche phenomenon when a single photon enters the APD, for example. By converting the current into a pulse signal and counting the number of pulse signals, the number of incoming photons can be measured directly. As such, an improvement in the S/N ratio can be anticipated, without producing RTS noise. Japanese Patent Laid-Open No. 2014-81253 discloses a distance-measurement sensor constituted by the APDs of a plurality of pixels as an example of a sensing device employing APDs.

An overview of the operations of a conventional photon counting type image sensor will be given here using FIGS. 9A to 9E. FIG. 9A illustrates an equivalent circuit of a unit pixel (called simply a "pixel" hereinafter) of a photon counting type image sensor in which the APDs operate in Geiger mode. The pixel is constituted by an APD, a comparator, a quenching resistor, and resistors $R_1$ and $R_2$.

The anode end of the APD is grounded, while the cathode end is connected to the quenching resistor. A reverse bias voltage from a voltage HVDD is applied via the quenching resistor. At this time, a voltage difference between the voltage HVDD and GND is set to be greater than or equal to a breakdown voltage for putting the APD into Geiger mode.

FIG. 9B is a conceptual diagram illustrating the APD operating in Geiger mode. When standing by for a photon to enter, the APD is in a state α at the starting point of operation A. When a photon enters the APD in this state, the avalanche phenomenon occurs in the APD and a large current flows in the APD. When this current flows, the voltage at the cathode end of the APD drops due to the quenching resistor. This results in a drop in the reverse bias due to the I-V characteristics of the APD, and the state transitions as indicated by operation A. The voltage drop at the cathode end of the APD causes the reverse bias voltage applied to the APD to become lower than the breakdown voltage, and the avalanche phenomenon stops as a result (state β). After the avalanche phenomenon stops and the operation transitions to operation B, the cathode end of the APD is charged by the voltage HVDD, and the state returns to state α at the starting point of operation A (operation C).

FIG. 9C illustrates transitions in a voltage $V_{APD}$ at the cathode end of the APD when the operations move from state α, through operations A to C, and then return to state α. The period from time $t_0$ to $t_1$ is a photon entry standby period. When a photon enters the APD at time $t_1$, the operation passes through operation A and transitions to state β at time $t_2$, passes through operation B and operation C, and then returns to state α at time $t_3$.

As illustrated in FIG. 9A, the voltage $V_{APD}$ at the cathode end of the APD is input to one input terminal of the comparator, and a threshold voltage $V_{th}$ obtained by dividing a reference voltage $V_{ref}$ with the resistor $R_1$ and the resistor $R_2$ is input to the other input terminal. The threshold voltage $V_{th}$ is set to a potential between $V_0$ and $V_{min}$ so that a change in the voltage $V_{APD}$ can be detected when a photon enters, as described above.

The comparator outputs a single pulse signal during the period from when the voltage $V_{APD}$ drops below $V_{th}$ to when the voltage $V_{APD}$ once again surpasses the $V_{th}$ (a period in which the voltage $V_{APD}$ falls below and returns above the $V_{th}$ level). Accordingly, connecting a counter to the output of the comparator makes it possible to count the number of incoming photons. Thus by repeating operation A to operation C, the number of photons entering the APD can be measured.

However, the above-described conventional technique has a problem in that if a photon enters during a time period shorter than the dead time (i.e., if the number of photons entering increases during a set period), it becomes impossible to separate the pulse signals, leading to saturation and a worsening in the linearity in high-luminance areas.

For example, when two photons enter in a short interval, the voltage $V_{APD}$ drops below and returns above the $V_{th}$ level only once, as illustrated in FIG. 9D, which means that a count value of 1 is output. In other words, with the pixel illustrated in FIG. 9A, photons cannot be counted accurately if the photons enter during an interval shorter than the dead time. This state in which photons enter in a period shorter than a predetermined amount of time and cannot be counted accurately will be called a "count-saturation state" hereinafter.

FIG. 9E illustrates a count value obtained when counting incoming photons using the pixel illustrated in FIG. 9A. The horizontal axis represents the number of incoming photons, and the vertical axis represents the count value. As can be seen from this graph, the count value is $K_C$ both when $K_1$ photons are entering and when $K_2$ photons are entering, making it impossible to distinguish between the two. In other words, the count-saturation state cannot be identified even if the actual number of incoming photons is $K_2$.

SUMMARY OF THE INVENTION

The present invention has been made in consideration of the above situation, and provides a photon counting type image sensor that makes it possible to determine whether or not a pixel is in a count-saturation state. The present invention furthermore makes it possible to determine whether or not a pixel in that image sensor is in a count-saturation state.

According to the present invention, provided is an image sensor comprising a plurality of pixels, each pixel including: a light-receiving element that outputs an output voltage that varies in response to a photon entering; at least one comparator that compares the output voltage with a plurality of mutually-different threshold voltages and outputs a single signal each time the output voltage varies so as to exceed either of the threshold voltages; and at least one counter that counts a number of signals output by the comparator upon comparing the output voltage with the plurality of threshold voltages and outputs a count value, for each of the threshold voltages.

Further, according to the present invention, provided is an image sensor comprising: a pixel array including a plurality of first pixels and a plurality of second pixels, each pixel having a light-receiving element that outputs an output voltage that varies in response to a photon entering, wherein each of the first pixels includes: a first generator that generates a first threshold voltage; a first comparator that compares the output voltage with the first threshold voltage and outputs a single signal each time the output voltage varies so as to exceed the first threshold voltage; and a first counter that counts a number of signals output from the first comparator and outputs a first count value, and each of the second pixels includes: a second generator that generates a second threshold voltage different from the first threshold voltage; a second comparator that compares the output voltage with the second threshold voltage and outputs a single signal each time the output voltage varies so as to exceed the second threshold voltage; and a second counter that counts a number of signals output from the second comparator and outputs a second count value.

Furthermore, according to the present invention, provided is an image capturing apparatus comprising: the image sensor comprising a plurality of pixels, each pixel including: a light-receiving element that outputs an output voltage that varies in response to a photon entering; at least one comparator that compares the output voltage with a plurality of mutually-different threshold voltages and outputs a single signal each time the output voltage varies so as to exceed either of the threshold voltages; and at least one counter that counts a number of signals output by the comparator upon comparing the output voltage with the plurality of threshold voltages and outputs a count value, for each of the threshold voltages; and a determinator that determines that a pixel for which a difference between the count values obtained for the respective threshold voltages output from the image sensor is greater than or equal to a predetermined threshold is a saturated pixel.

Further, according to the present invention, provided is an image capturing apparatus comprising: the image sensor comprising: a pixel array including a plurality of first pixels and a plurality of second pixels, each pixel having a light-receiving element that outputs an output voltage that varies in response to a photon entering, wherein each of the first pixels includes: a first generator that generates a first threshold voltage; a first comparator that compares the output voltage with the first threshold voltage and outputs a single signal each time the output voltage varies so as to exceed the first threshold voltage; and a first counter that counts a number of signals output from the first comparator and outputs a first count value, and each of the second pixels includes: a second generator that generates a second threshold voltage different from the first threshold voltage; a second comparator that compares the output voltage with the second threshold voltage and outputs a single signal each time the output voltage varies so as to exceed the second threshold voltage; and a second counter that counts a number of signals output from the second comparator and outputs a second count value; and a determinator that determines that a pixel for which a difference between the count values obtained for the respective threshold voltages output from the image sensor is greater than or equal to a predetermined threshold is a saturated pixel.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are diagrams illustrating the configuration of an image sensor according to the first and second embodiments.

FIG. 3 is a diagram illustrating the configuration of part of a pixel and a pixel computation unit according to the first embodiment.

FIGS. 6A and 6B are diagrams illustrating an example of a pixel arrangement according to a variation on the first embodiment.

FIG. 7 is a diagram illustrating the configuration of part of a pixel and a pixel computation unit according to the second embodiment.

FIG. 8 is a diagram illustrating an example of a pixel arrangement according to a variation on the second embodiment.

FIGS. 9A to 9E are diagrams pertaining to a photon counting type image sensor according to a conventional technique.

DESCRIPTION OF THE EMBODIMENTS

Exemplary embodiments of the present invention will be described in detail in accordance with the accompanying drawings.

First Embodiment

An image capturing system using a photon counting type image sensor according to a first embodiment will be described here. Note that the first embodiment describes a photon counting type image sensor having two comparators in all pixels in an image sensor, with different reference signals being input to the respective comparators.

Figure 1:
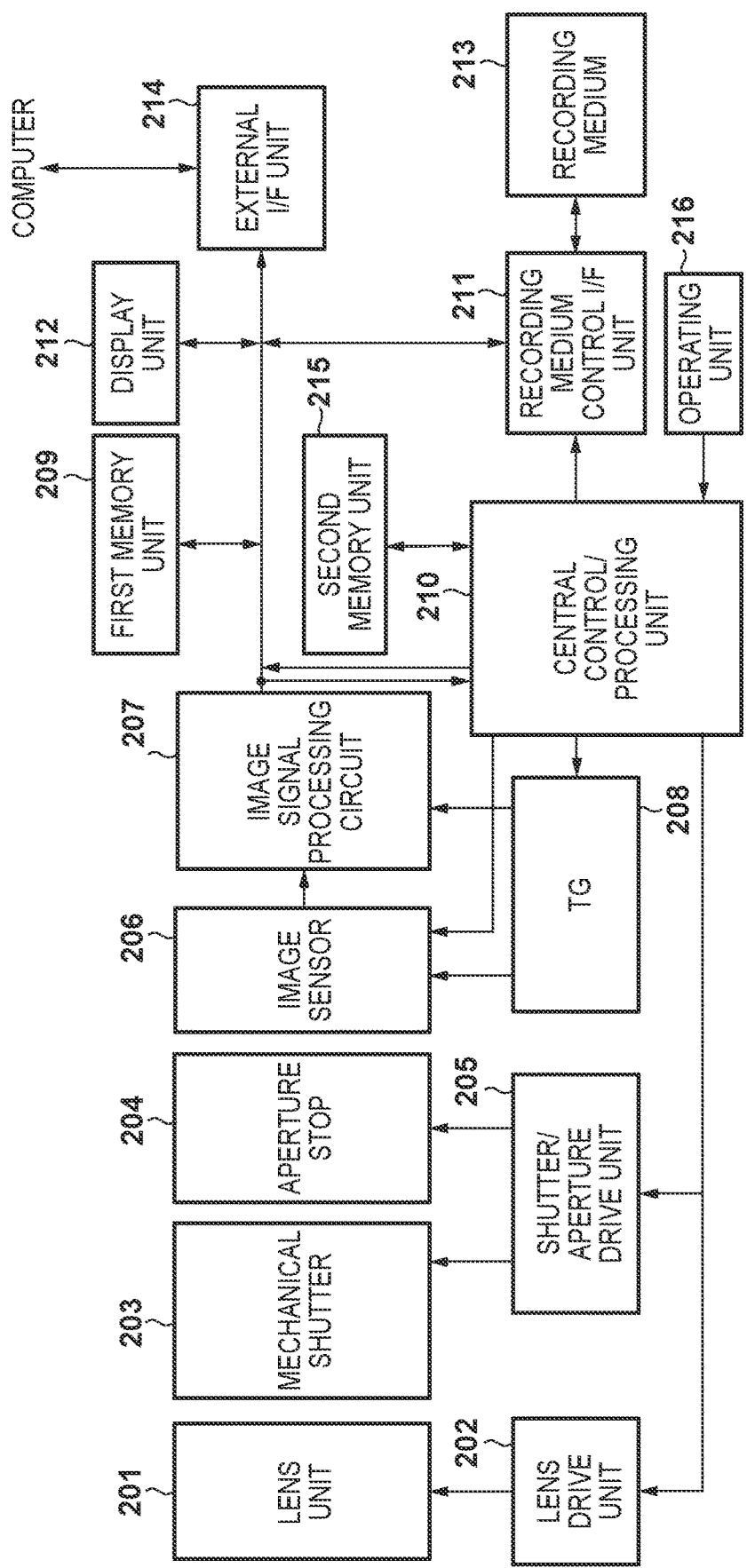
FIG. 1 is a block diagram illustrating the overall configuration of an image capturing apparatus according to first and second embodiments.

FIG. 1 is a block diagram illustrating the overall configuration of an image capturing apparatus according to the first embodiment. In FIG. 1, a lens unit 201 is constituted by a plurality of lenses including a zoom lens, and changes a focal length from a wide end to a tele end under the control of a lens drive unit 202.

A mechanical shutter 203, and an aperture stop 204 (a light amount adjusting member) in the following stage, constitute an exposure amount adjusting mechanism that mechanically controls an illumination time of light incident on an image sensor 206. The shutter 203 and the aperture stop 204 are driven and controlled by a shutter/aperture drive unit 205.

A subject image that has traversed the lens unit 201 including the zoom lens is formed on the image sensor 206 at an exposure amount adjusted to an appropriate amount by the shutter 203 and the aperture stop 204. The subject image, which is formed on a plurality of pixels in the image sensor 206, is converted into two-dimensional digital data in the image sensor 206, which is then sent to an image signal processing circuit 207. The image sensor 206 will be described in detail later.

The image signal processing circuit 207 generates image data by carrying out various types of image signal processing such as low-pass filtering for reducing noise, shading correction, WB adjustment, and the like, as well as various types of correction such as defect correction, dark shading correction, and black subtraction, compression, and the like.

A central control/processing unit 210 carries out control of and various types of operations for the image capturing apparatus as a whole. A timing generator (TG) 208 generates a drive pulse for driving the image sensor 206 on the basis of a control signal from the central control/processing unit 210. A first memory unit 209 temporarily stores the image data.

A recording medium control interface (I/F) unit 211 records image data to, and reads out image data from, a recording medium 213, which is a removable storage medium such as semiconductor memory. A display unit 212 displays image data and the like. An external interface (I/F) unit 214 is an interface for communicating with an external computer or the like.

A second memory unit 215 stores various types of parameters, such as processing results from the central control/processing unit 210, shooting conditions, and so on. Information regarding driving conditions of the image capturing apparatus set by a user through an operating unit 216 is sent to the central control/processing unit 210, and the image capturing apparatus is controlled as a whole on the basis of that information.

FIGS. 2A and 2B illustrate the overall structure of the image sensor 206. In the present embodiment, as an example, a sensor substrate 301 and a circuit board 302 are stacked so as to be electrically connected, providing the image sensor with a stacked structure.

As illustrated in FIG. 2A, a pixel array is formed on the sensor substrate 301 by arranging a plurality of pixels 303 two-dimensionally. The configuration of the pixel 303 will be described in greater detail later. A pixel computation unit 304 and a signal processing circuit 305 are formed on the circuit board 302.

The pixel computation unit 304 is electrically connected to the pixels on the sensor substrate 301 by bumps or the like. The pixel computation unit 304 outputs control signals for driving the pixels 303, and carries out various types of processing upon receiving comparator outputs from the pixels 303.

The pixel computation unit 304 includes a counter circuit that measures the number of pulse signals from the comparators output in response to photons entering the corresponding pixels. A count value obtained by the pixel computation unit 304 is output to the exterior of the image sensor 206 by the signal processing circuit 305.

FIG. 2B is a diagram illustrating part of a color filter array used in the image sensor 206, which is included in the pixel array illustrated in FIG. 2A. This color filter arrangement is known as a Bayer array, in which a first color filter of red (R), a second color filter of green (Gr), a third color filter of green (Gb), and a fourth color filter of blue (B) are arranged in a repeating pattern. Among primary color filter arrangements, this arrangement provides a high resolution and excellent color reproduction.

The configuration of the pixel 303 and part of the pixel computation unit 304 will be described next with reference to FIG. 3.

The pixel 303 is constituted by a quenching resistor 101, an APD 102 serving as a light-receiving element, a first comparator 103, a second comparator 104, and resistors $R_{A1}$, $R_{A2}$, $R_{B1}$, and $R_{B2}$ for generating threshold voltages $Vth_A$ and $Vth_B$. The constituent elements of the pixel 303 are arranged on the sensor substrate 301. Note that the other pixels included in the pixel array also have the same configuration. The pixel computation unit 304 includes a first counter 105 and a second counter 106 corresponding to each pixel 303, and those counters are arranged on the circuit board 302.

The anode end of the APD 102 is grounded, while the cathode end is connected to the quenching resistor 101. A reverse bias voltage from a voltage HVDD is applied across the APD 102 via the quenching resistor 101. At this time, a voltage difference between the voltage HVDD and GND is set to be greater than or equal to a breakdown voltage for putting the APD 102 into Geiger mode.

A voltage $V_{APD}$ at the cathode end of the APD 102 (an output voltage) is input to one input terminal of each of the first comparator 103 and the second comparator 104. Threshold voltages $Vth_A$ and $Vth_B$, respectively obtained by the resistors $R_{A1}$ and $R_{A2}$ and the resistors $R_{B1}$ and $R_{B2}$ dividing a reference voltage Vref, are input to the other input terminal of each of the first comparator 103 and the second comparator 104.

The voltage $V_{APD}$ at the cathode end of the APD 102 and the threshold voltage $Vth_A$ are input to the first comparator 103, and a pulse signal is output when the voltage $V_{APD}$ drops below and then returns above the level of the threshold voltage $Vth_A$. Likewise, the voltage $V_{APD}$ at the cathode end of the APD 102 and the threshold voltage $Vth_B$ are input to the second comparator 104, and a pulse signal is output when the voltage $V_{APD}$ drops below and then returns above the level of the threshold voltage $Vth_B$.

The pulse signals output from the first comparator 103 and the second comparator 104 are input to the first counter 105 and the second counter 106, respectively, where the numbers of pulse signals output from the comparators are measured.

A count-saturation detection process, and a process for replacing the output value of a count-saturated pixel with a count value of a count-saturated level, according to the first embodiment, will be described.

Figure 4A:
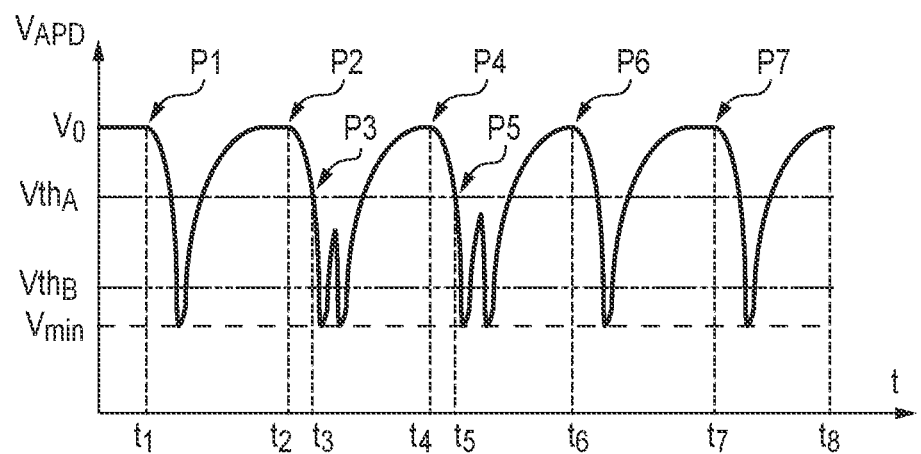
FIGS. 4A to 4C are diagrams illustrating examples of an output voltage value at a cathode end of an ADP and a comparator output, according to the first and second embodiments.

FIG. 4A illustrates how the voltage $V_{APD}$ varies when seven photons P1 to P7 are incident in that order during a period from time t1 to time t7. The vertical axis represents the voltage $V_{APD}$ and the horizontal axis represents time. In other words, FIG. 4A illustrates how the voltage $V_{APD}$ varies from a voltage $V_0$, arising when in a photon entry standby state, to a voltage $V_{min}$, when the avalanche phenomenon occurs and the voltage value drops to a minimum.

Figure 4B:
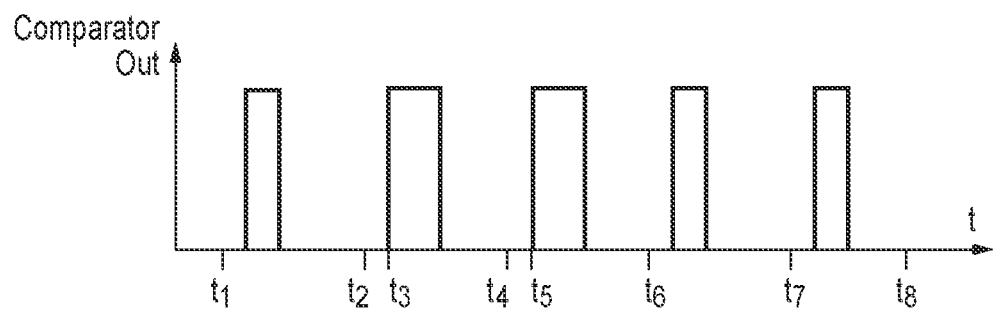
Figure 4C:
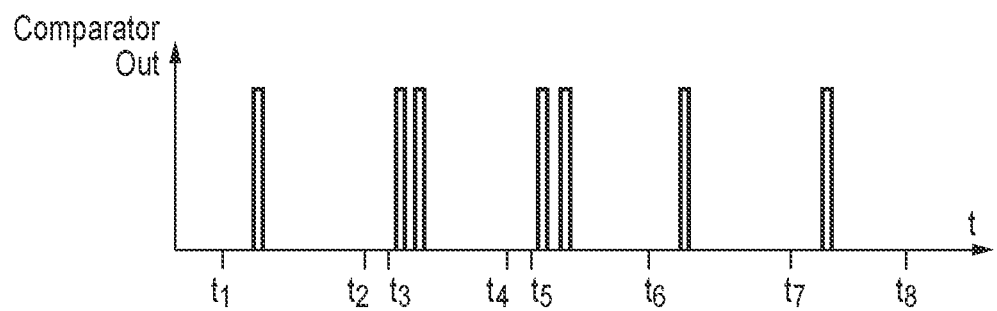

FIGS. 4B and 4C illustrate changes in the pulse signals output from the first comparator 103 and the second comparator 104, respectively. The vertical axis represents the comparator output and the horizontal axis represents time.

As illustrated in FIG. 4A, the threshold voltages $Vth_A$ and $Vth_B$ of the first comparator 103 and the second comparator 104 are values between the voltage $V_0$ when in the photon entry standby state and the minimum voltage $V_{min}$ when the avalanche phenomenon occurs. The threshold voltage $Vth_B$ is set to a lower value than the threshold voltage $Vth_A$ ($Vth_B < Vth_A$).

Time t1 to time t7 indicate the timings at which the photons P1 to P7 enter the APD 102, respectively. The periods from time $t_1$ to time $t_2$, from time t6 to time t7, and from time t7 to time t8 are periods where the photons P1, P6, and P7 enter during a time period longer than the dead time. The photons P1, P6, and P7 therefore cause the voltage $V_{APD}$ to shift from the voltage $V_0$ to the voltage $V_{min}$, after which the cathode of the APD 102 is charged by the voltage HVDD and the voltage converges once again on the voltage $V_0$ of the photon entry standby state.

On the other hand, the periods from time t2 to time t4 and from time t4 to time t6 are periods where the photons P2, P3, P4, and P5 enter during a time period shorter than the dead time. Thus while the photons P2 and P4 cause the voltage $V_{APD}$ to shift from the voltage $V_0$ to the voltage $V_{min}$, the voltage reaches $V_{min}$ again due to the avalanche phenomenon caused by the photons P3 and P5 before the voltage across the APD 102 can completely returns to the voltage $V_0$. The cathode is then charged by the voltage HVDD, and the voltage across the APD 102 returns to $V_0$ in the photon entry standby state.

At this time, as illustrated in FIG. 4B, the first comparator 103, which is input with the threshold $Vth_A$ as a threshold voltage, outputs individual pulse signals in response to the variation in the voltage $V_{APD}$ caused by the photons P1, P6, and P7 entering. However, the variation in the voltage $V_{APD}$ caused by the photons P2 and P3 is output as a single, combined pulse signal. Likewise, the variation in the voltage $V_{APD}$ caused by the photons P4 and P5 entering is output as a single, combined pulse signal.

On the other hand, as illustrated in FIG. 4C, the second comparator 104, which is input with the threshold $Vth_B$ as a threshold voltage, outputs individual pulse signals in response to the variation in the voltage $V_{APD}$ caused by the photons P1 to P7 entering.

Here, if the address (X,Y) of the pixel 303 in the two-dimensional pixel array of the image sensor 206 is (x,y), the count values obtained from the first counter 105 and the second counter 106 are denoted by KA(x,y) and KB(x,y), respectively (where 1≤X≤xmax and 1≤Y≤ymax). In this case, KA(x,y)=5 and KB(x,y)=7 in the example illustrated in FIGS. 4A to 4C.

The count values KA(x,y) and KB(x,y) obtained from the pixel 303 are output to the signal processing circuit 305. The signal processing circuit 305 carries out a process for determining whether or not the pixel 303 is counter-saturated, and a process for replacing the pixel output value for a pixel determined to be counter-saturated (called a "counter-saturated pixel" hereinafter). The processing by the signal processing circuit 305 will be described next with reference to FIG. 5.

First, in step S10, the count values KA(x,y) and KB(x,y) are obtained from the pixel 303, and in step S11, a difference ΔK between KA(x,y) and KB(x,y) is calculated through the following equation (1).

$$\Delta K = KB(x,y) - KA(x,y) \quad (1)$$

In step S12, the difference ΔK obtained through equation (1) is compared with a predetermined counter saturation determination threshold KthS (where KthS>0). If the difference ΔK is greater than or equal to the counter saturation determination threshold KthS, the pixel is determined to be a count-saturated pixel, and the process moves to step S13. However, if the difference ΔK is less than the counter saturation determination threshold KthS, the pixel is determined to not be a count-saturated pixel, and the process moves to step S15.

In step S13, a determination flag J(x,y) is set to 1, indicating that the pixel is a count-saturated pixel, and in step S14, a count value KS of the count-saturated level (where KS>0) is selected as a pixel output value Iout(x,y). Note that, for example, the APD 102 can be exposed for a predetermined exposure time to generate a graph such as that illustrated in FIG. 9E, and the obtained maximum count value that has been changed in accordance with the actual exposure time can be used as the count value KS.

On the other hand, in step S15, the determination flag J(x,y) is set to 0, indicating that the pixel is not a count-saturated pixel, and in step S16, the count value KA(x,y) is selected as the pixel output value Iout(x,y).

In step S17, the determination flag J(x,y) set in step S13 or step S15, and the pixel output value Iout(x,y) selected in step S14 or step S16, are output, and the process ends. The signal processing circuit 305 carries out this processing for each pixel.

The processing from step S10 to step S17 is carried out for all the pixels 303 (1≤X≤xmax, 1≤Y≤ymax) in the image sensor 206, and the determination flag J(x,y) and the pixel output value Iout(x,y) are found for each.

The signal processing circuit 305 calculates a total number of saturated pixels KAS, which is the number of pixels for which the determination flag J(x,y) is set to 1, among the determination flags J(x,y) of all the pixels 303 found through the above-described processing. The pixel output values Iout(x,y) for all the pixels 303 found through the above-described processing and the total number of saturated pixels KAS are output to the image signal processing circuit 207, where various types of image signal processing, correction processing, and the like are carried out on the pixel output values Iout(x,y).

The total number of saturated pixels KAS is also sent to the central control/processing unit 210 through the image signal processing circuit 207. If the total number of saturated pixels KAS is greater than or equal to a predetermined number, the central control/processing unit 210 determines that too many photos are entering the image sensor 206 and outputs a command to the shutter/aperture drive unit 205 to reduce the aperture stop 204 by one stop. The present invention is not limited thereto, however, and light reduction control may be carried out using an optical device such as an ND filter.

According to the first embodiment as described thus far, in a photon counting type image sensor, it can be determined whether or not each pixel is in a count-saturation state. Pixels determined to be in a count-saturation state can have the count values replaced with count values of a count-saturated level, which are then output from the image sensor. Furthermore, if the number of pixels in the count-saturation state is greater than or equal to a predetermined number, control for reducing the number of photons entering the image sensor can be carried out on the basis of the data output from the image sensor.

Figure 5:
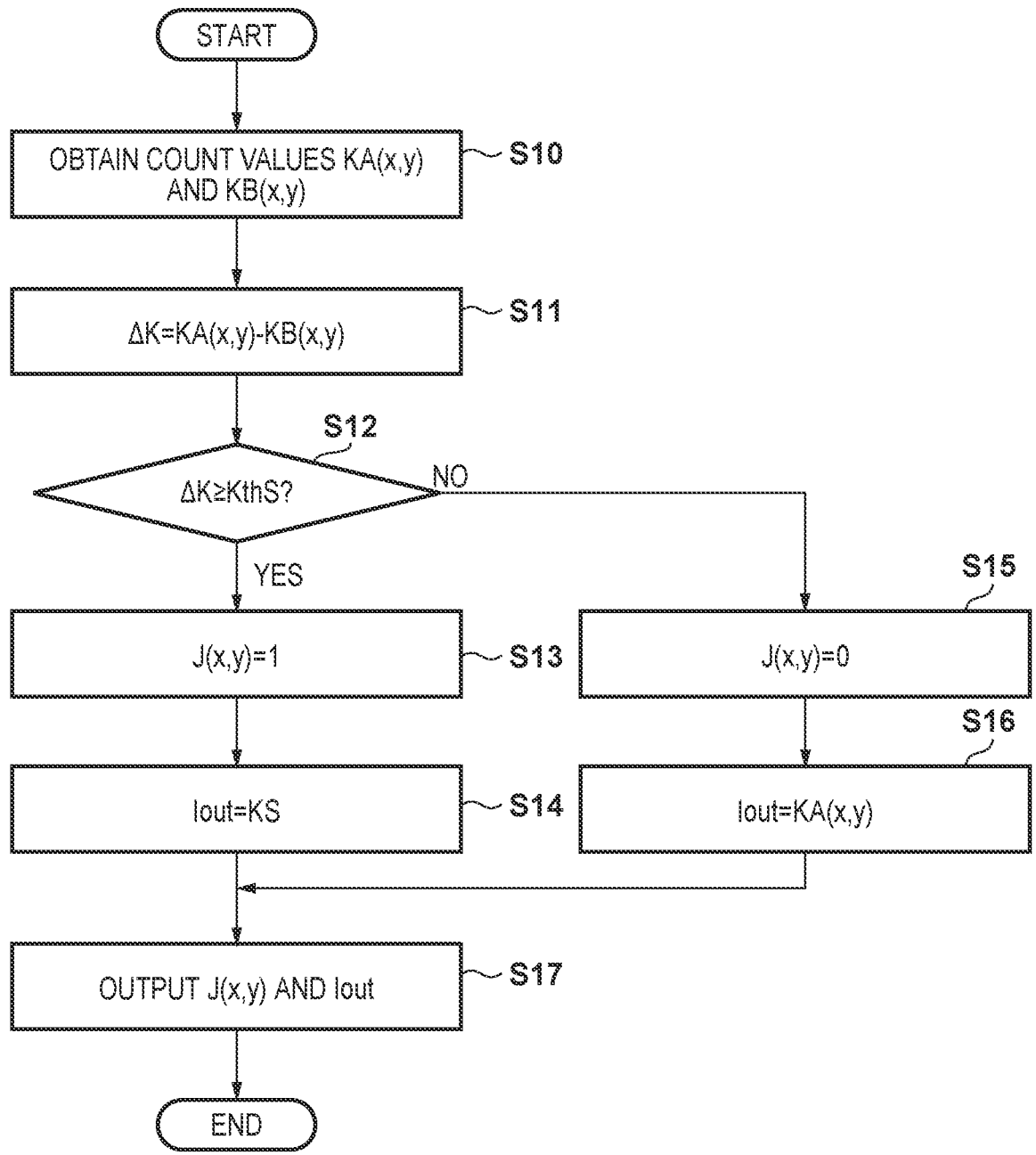
FIG. 5 is a flowchart illustrating a counter-saturation pixel determination process and a replacement process according to the first embodiment.

The foregoing describes an example in which the processing illustrated in FIG. 5 is carried out by the signal processing circuit 305 in the image sensor 206. However, the present invention is not limited thereto, and the processing may instead be carried out by a circuit outside the image sensor 206. For example, it is conceivable that the count values KA(x,y) and KB(x,y) obtained from the first counter 105 and the second counter 106 be output to the image signal processing circuit 207, with the processing illustrated in FIG. 5 being carried out by the image signal processing circuit 207.

Variation on First Embodiment

The foregoing first embodiment describes a case where all the pixels 303 in the image sensor 206 have two comparators, with different reference signals being input to the respective comparators. However, the configuration may be such that two comparators are provided only for one out of every several pixels. A pixel having two comparators will be called a "determination pixel" hereinafter.

FIGS. 6A and 6B illustrates examples of layouts when only some of the plurality of pixels 303 in the pixel array serve as determination pixels, where the determination pixels are indicated by hatching. The other pixels are normal pixels having only a single comparator, as illustrated in FIG. 9A.

FIG. 6A illustrates a case where only the Gb pixels are determination pixels, whereas FIG. 6B illustrates a case where only one out of every four Gb pixels is a determination pixel. With a configuration in which only some of the pixels are determination pixels, whether or not a determination pixel is count-saturated can be determined as described with reference to the flowchart in FIG. 5. That determination result is then used to estimate whether or not pixels in the area near the determination pixel are count-saturated. The estimation method is not particularly limited in the present invention. For example, if more than a predetermined number of adjacent determination pixels are count-saturated, a determination of count saturation may be made, or a count saturation can be estimated from a distribution of determination pixels determined to be count-saturated pixel.

Second Embodiment

A second embodiment of the present invention will be described next. The second embodiment will describe a case where, in a photon counting type image sensor in which all pixels in the image sensor 206 have a single comparator, the number of photons from the same subject is counted twice. In the present second embodiment, the overall configuration of the image capturing apparatus and the entire configuration of the image sensor 206 are the same as those described in the first embodiment with reference to FIGS. 1, 2A, and 2B, and thus descriptions thereof will be omitted here.

The configuration of the pixel 303 and part of the pixel computation unit 304 according to the second embodiment will be described next with reference to FIG. 7. The configuration illustrated in FIG. 7 is used instead of the configuration described in the first embodiment with reference to FIG. 3.

The pixel 303 includes a quenching resistor 701, an APD 702, a comparator 703, a selector switch 704, and the resistors $R_{A1}$, $R_{A2}$, $R_{B1}$, and $R_{B2}$ for generating the threshold voltages $Vth_A$ and $Vth_B$ input to the comparator. The constituent elements of the pixel 303 are arranged on the sensor substrate 301. Note that the other pixels included in the pixel array have the same configuration. The pixel computation unit 304 includes a counter 705 corresponding to each pixel 303, and the counter is arranged on the circuit board 302.

The anode end of the APD 702 is grounded, while the cathode end is connected to the quenching resistor 701. A reverse bias voltage from a voltage HVDD is applied across the APD 702 via the quenching resistor 701. At this time, a voltage difference between the voltage HVDD and GND is set to be greater than or equal to a breakdown voltage for putting the APD 702 into Geiger mode.

The voltage $V_{APD}$ at the cathode end of the APD 702 is input to one input terminal of the comparator 703. The switch 704 is connected to the other input terminal of the comparator 703. Switching the switch 704 makes it possible to input one of the threshold voltages $Vth_A$ and $Vth_B$, obtained by dividing the reference voltage Vref using the resistors $R_{A1}$ and $R_{A2}$ or the resistors $R_{B1}$ and $R_{B2}$.

When the voltage $V_{APD}$ at the cathode end of the APD 702 and the threshold voltage $Vth_A$ are input to the comparator 703, and a pulse signal is output when the voltage $V_{APD}$ drops below and then returns above the level of the threshold voltage $Vth_A$. Likewise, when the voltage $V_{APD}$ at the cathode end of the APD 702 and the threshold voltage $Vth_B$ are input to the comparator 703, and a pulse signal is output when the voltage $V_{APD}$ drops below and then returns above the level of the threshold voltage $Vth_B$.

The pulse signals output from the comparator 703 are input to the counter 705, and the numbers of the pulse signals are measured.

Operations of the pixel 303 and the pixel computation unit 304 configured as described above, according to the second embodiment, will be described with reference to FIGS. 4A to 4C.

First, the switch 704 is switched so that the threshold voltage at the comparator 703 goes to $Vth_A$, and the first photon count is taken. Immediately after the first photon count, the switch 704 is switched to change the threshold voltage at the comparator 703 from $Vth_A$ to $Vth_B$, after which the second photon count is taken.

Assuming the time periods of the first photon count and the second photon count are sufficiently short and a constant amount of photons are entering from the subject, the voltage $V_{APD}$ will vary in an almost identical manner in both the first photon count period and the second photon count period.

Assuming that a photon furthermore enters at the same points in time in both the first photon count period and the second photon count period, the voltage $V_{APD}$ will vary in the manner illustrated in FIG. 4A. In this case, in the first photon count period, the output of the comparator 703 is the pulse signals as illustrated in FIG. 4B. Likewise, in the second photon count period, the output of the comparator 703 is the pulse signals as illustrated in FIG. 4C.

Here, assume that the address of a pixel 303 in the two-dimensional pixel array of the image sensor 206 is (x,y). Assume also that the count value obtained from the counter 705 in the first photon count is KA(x,y), and the count value obtained from the counter 705 in the second photon count is KB(x,y). In this case, KA(x,y)=5 and KB(x,y)=7 in the example illustrated in FIGS. 4A to 4C.

Thereafter, the count saturation determination process and the process for replacing the output value of a count-saturated pixel with a count value of a count-saturated level, described in the first embodiment with reference to FIG. 5, are carried out, and the pixel output value Iout(x,y) and the determination flag J(x,y) are obtained. The total number of saturated pixels KAS is obtained from the determination flags J(x,y) of all of the pixels 303.

According to the second embodiment as described thus far, in a photon counting type image sensor, it can be determined whether or not each pixel in the image sensor is in a count-saturation state, even if each pixel has only one comparator, by switching the threshold voltage.

Pixels determined to be in a count-saturation state can have the count values replaced with count values of a count-saturated level, which are then output from the image sensor. Furthermore, if the number of pixels in the count-saturation state is greater than or equal to a predetermined number, control for reducing the number of photons entering the image sensor can be carried out on the basis of the data output from the image sensor.

Like the variation on the first embodiment described with reference to FIGS. 6A and 6B, some of the plurality of pixels 303 in the pixel array may be pixels configured as illustrated in FIG. 7.

Variation on Second Embodiment

The foregoing second embodiment describes a case where all the pixels 303 in the image sensor 206 are configured as illustrated in FIG. 7, and the threshold voltage is switched. However, the present variation will describe another configuration in which different threshold voltages are used. Although the pixel 303 according to the present variation has the same configuration as that illustrated in FIG. 9A, one of the threshold voltages $Vth_A$ and $Vth_B$ is supplied to the comparator.

FIG. 8 illustrates an example of a layout when different threshold voltages are supplied to the comparators of the pixels 303 in the pixel array. The shaded pixels 303 indicate pixels where the threshold voltage for the comparator is fixed to $Vth_B$, whereas the other pixels indicate pixels where the threshold voltage for the comparator is fixed to $Vth_A$.

In the example illustrated in FIG. 8, the threshold voltage is fixed to $Vth_B$ only for the Gb pixels. At this time, the processing illustrated in FIG. 5 is carried out for the Gr and Gb count values, and it is determined whether or not the Gr and Gb pixels are count-saturated. On the basis of this result, it is estimated whether or not the adjacent R and B pixels are also count-saturated, specifically, a similar determination result as the Gr and Gb is obtained.

The method for generating the threshold voltage $Vth_A$ and the threshold voltage $Vth_B$ is the same as that described in the first embodiment. In other words, with the layout illustrated in FIG. 8, the reference voltage Vref is divided by the resistors $R_{B1}$ and $R_{B2}$ in the pixels 303 that are shaded, whereas the reference voltage Vref is divided by the other resistors $R_{A1}$ and $R_{A2}$ in the other pixels 303. By using such a configuration, where one of a plurality of threshold voltages is supplied to the comparator of each pixel, whether or not each pixel is in a count-saturation state can be determined without increasing the size of the pixel circuits.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-139621 filed on Jul. 25, 2018 which is hereby incorporated by reference herein in its entirety.

What is claimed is:

1. An image sensor comprising a plurality of pixels, each pixel including:
   an avalanche photodiode that is driven in Geiger mode and outputs an output voltage that varies in response to a photon entering;
   a quenching resistor;
   at least one comparator that compares the output voltage with a first threshold voltage or a second threshold voltage different from the first threshold voltage and outputs a single signal each time the output voltage varies so as to exceed either of the first and second threshold voltages; and
   at least one counter that counts a number of signals output by the comparator upon comparing the output voltage with the first and second threshold voltages and outputs a count value, for each of the first and second threshold voltages.

2. The image sensor according to claim 1,
   wherein the comparator includes:
   a first comparator that compares the output voltage with the first threshold voltage and outputs a single signal each time the output voltage varies so as to exceed the first threshold voltage; and
   a second comparator that compares the output voltage with the second threshold voltage and outputs a single signal each time the output voltage varies so as to exceed the second threshold voltage, and
   the counter includes:
   a first counter that counts a number of signals output from the first comparator and outputs a first count value; and
   a second counter that counts a number of signals output from the second comparator and outputs a second count value.

3. The image sensor according to claim 2,
   wherein a difference between the output voltage and the first threshold voltage when a photon is not entering is lower than a difference between the output voltage and the second threshold voltage when a photon is not entering.

4. The image sensor according to claim 1,
   wherein
   each of the plurality of pixels further includes a switch that switches between the first threshold voltage and the second threshold voltage and supplies the voltage to the comparator; and
   the counter counts a number of signals output from the comparator when comparing the output voltage with the first threshold voltage and outputs a first count value, and counts a number of signals output from the comparator when comparing the output voltage with the second threshold voltage and outputs a second count value.

5. The image sensor according to claim 4,
   wherein a difference between the output voltage and the first threshold voltage when a photon is not entering is lower than a difference between the output voltage and the second threshold voltage when a photon is not entering.

6. The image sensor according to claim 1,
   wherein the plurality of pixels are all the pixels in the image sensor.

7. The image sensor according to claim 1, further comprising:

a determinator that determines that a pixel for which a difference between the count values obtained for the first and second threshold voltages is greater than or equal to a predetermined threshold is a saturated pixel.

8. The image sensor according to claim 7, wherein a predetermined count value is output to the exterior of the image sensor from the pixel determined to be a saturated pixel.

9. An image sensor comprising:
a pixel array including a plurality of first pixels and a plurality of second pixels, each pixel having an avalanche photodiode that is driven in Geiger mode and outputs an output voltage that varies in response to a photon entering,
wherein each of the first pixels includes:
a first quenching resistor;
a first generator that generates a first threshold voltage;
a first comparator that compares the output voltage with the first threshold voltage and outputs a single signal each time the output voltage varies so as to exceed the first threshold voltage; and
a first counter that counts a number of signals output from the first comparator and outputs a first count value, and
each of the second pixels includes:
a second quenching resistor;
a second generator that generates a second threshold voltage different from the first threshold voltage;
a second comparator that compares the output voltage with the second threshold voltage and outputs a single signal each time the output voltage varies so as to exceed the second threshold voltage; and
a second counter that counts a number of signals output from the second comparator and outputs a second count value.

10. The image sensor according to claim 9, wherein a difference between the output voltage and the first threshold voltage when a photon is not entering is lower than a difference between the output voltage and the second threshold voltage when a photon is not entering.

11. The image sensor according to claim 9, further comprising:
a determinator that determines that a pixel for which a difference between the count values obtained for the first and second threshold voltages is greater than or equal to a predetermined threshold is a saturated pixel.

12. The image sensor according to claim 11, wherein a predetermined count value is output to the exterior of the image sensor from the pixel determined to be a saturated pixel.

13. An image capturing apparatus comprising:
the image sensor comprising a plurality of pixels, each pixel including:
an avalanche photodiode that is driven in Geiger mode and outputs an output voltage that varies in response to a photon entering;
a quenching resistor;
at least one comparator that compares the output voltage with a first threshold voltage or a second threshold voltage different from the first threshold voltage and outputs a single signal each time the output voltage varies so as to exceed either of the first and second threshold voltages; and
at least one counter that counts a number of signals output by the comparator upon comparing the output voltage with the first and second threshold voltages and outputs a count value, for each of the first and second threshold voltages; and
a determinator that determines that a pixel for which a difference between the count values obtained for the first and second threshold voltages output from the image sensor is greater than or equal to a predetermined threshold is a saturated pixel.

14. An image capturing apparatus comprising:
the image sensor comprising:
a pixel array including a plurality of first pixels and a plurality of second pixels, each pixel having an avalanche photodiode that is driven in Geiger mode and outputs an output voltage that varies in response to a photon entering,
a first quenching resistor;
wherein each of the first pixels includes:
a first generator that generates a first threshold voltage;
a first comparator that compares the output voltage with the first threshold voltage and outputs a single signal each time the output voltage varies so as to exceed the first threshold voltage; and
a first counter that counts a number of signals output from the first comparator and outputs a first count value, and
each of the second pixels includes:
a second quenching resistor;
a second generator that generates a second threshold voltage different from the first threshold voltage;
a second comparator that compares the output voltage with the second threshold voltage and outputs a single signal each time the output voltage varies so as to exceed the second threshold voltage; and
a second counter that counts a number of signals output from the second comparator and outputs a second count value; and
a determinator that determines that a pixel for which a difference between the count values obtained for the respective threshold voltages output from the image sensor is greater than or equal to a predetermined threshold is a saturated pixel.

* * * * *